United States Patent [19]
Savage

[11] Patent Number: 5,226,352
[45] Date of Patent: Jul. 13, 1993

[54] APPARATUS AND METHOD FOR MOLDING AND BAKING DOUGH

[75] Inventor: Don H. Savage, Sandy, Utah
[73] Assignee: Bakamold, Inc., Salt Lake City, Utah
[21] Appl. No.: 846,032
[22] Filed: Mar. 5, 1992
[51] Int. Cl.$^5$ ............................................. A23P 1/10
[52] U.S. Cl. ............................ 99/439; 249/144; 249/163; 249/DIG. 1; 425/383; 425/388
[58] Field of Search .............. 99/349, 428, 432, 433, 99/439, 442, DIG. 15; 206/544, 549, 564; 220/469, 912; 249/144, 160, 163, 167, DIG. 1; 425/383, 387.1, 388, 394, 398, 399, 403

[56] References Cited

U.S. PATENT DOCUMENTS

| | | | |
|---|---|---|---|
| 823,216 | 6/1906 | Haddock | 99/433 |
| 987,525 | 3/1911 | Wing . | |
| 1,286,651 | 12/1918 | Kendall | 249/167 |
| 1,728,064 | 9/1929 | Johnson | 99/439 |
| 1,794,238 | 2/1931 | McKibben . | |
| 2,233,064 | 2/1941 | Stutzner . | |
| 2,506,928 | 5/1950 | Klingbiel | 99/433 |
| 2,829,057 | 4/1958 | Voelker . | |
| 3,307,502 | 3/1967 | Armour | 425/383 |
| 3,309,738 | 3/1967 | Friedman | 249/160 |
| 3,332,658 | 7/1967 | Lemelson | 249/160 |
| 3,385,205 | 5/1968 | McCloud | 99/439 |
| 4,164,341 | 8/1979 | McComb | 249/163 |
| 4,348,949 | 9/1982 | Selleck | 99/439 |
| 4,359,443 | 11/1982 | Michaels | 249/160 |
| 4,371,327 | 2/1983 | Fievez | 425/398 |
| 4,383,955 | 5/1983 | Rubio et al. | 249/163 |

FOREIGN PATENT DOCUMENTS

| | | | |
|---|---|---|---|
| 46364 | 10/1932 | Denmark | 99/428 |
| 78037 | 8/1954 | Denmark | 425/394 |
| 2933543 | 2/1981 | Fed. Rep. of Germany | 99/428 |
| 953080 | 11/1949 | France | 99/428 |
| 986416 | 7/1951 | France | 425/394 |
| 1148832 | 12/1957 | France | 425/394 |
| 1452271 | 8/1966 | France | 249/160 |
| 1456037 | 9/1966 | France | 425/387.1 |
| 1249335 | 11/1986 | Japan | 99/DIG. 15 |

Primary Examiner—Harvey C. Hornsby
Assistant Examiner—Mark Spisich
Attorney, Agent, or Firm—Thorpe, North & Western

[57] ABSTRACT

A cup-shaped mold for the shaping and baking of bread or cookie dough comprises an upper cupped molding member and a lower, slightly larger, cupped molding member. Each molding member has a flange horizontally extending from its edge. When the molding members are placed together with the dough between them, thereby forming the dough into cup-shaped, the flanges are in continuous contact along their length. During heating of the mold for baking, a plurality of clamps press the flanges together at between 0.5 and 1 p.s.i. to prevent escape of the dough from the mold while allowing partial escape of moisture from the mold.

21 Claims, 4 Drawing Sheets

APPARATUS AND METHOD FOR MOLDING AND BAKING DOUGH

FIELD OF THE INVENTION

The present invention concerns apparatuses of and methods for molding dough or batter into a particular shape and subsequently or simultaneously baking it. The invention particularly concerns systems which mold and bake dough in a shape of a cup or frustum.

BACKGROUND OF THE INVENTION

A number of inventions regarding the molding and baking of unleavening batter resulting in wafer-like confections such as ice cream cones and the like have been described in the prior art, e.g., McKibben, U.S. Pat. No. 1,794,238. Other inventions have dealt With the molding and baking of pie crusts, including Voelker, U.S. Pat. No. 2,829,057, Stutzner, U.S. Pat. No. 2,233,064, and Wing U.S. Pat. No. 987,525.

It has been found desirable to mold or form dough into different shapes which can be baked and marketed as novelty items and/or as substitutes for dishes. "Dough" as used herein means leavened or leavening doughs or batters. Many prior art apparatuses and techniques mold and bake dough of breads, cakes, cookies, and other baked goods into various shapes including containers which may be used to hold other foods. For example, Savage, U.S. Pat. No. 4,812,323, discloses a method for molding and baking cookie dough into a cupped shape which can then be used to hold ice cream or other confection. Brummett et al., U.S. Pat. No. 4,367,243, discloses a method for preparing pizza crust. Turner, U.S. Pat. No. 3,296,956, discloses a molding and baking apparatus for the baking of bread dough into a cup-like shape. White, U.S. Pat. 1,487,906, discloses a pan for baking cake dough into a container shape for holding ice cream. Other prior art references of interest include Huth et al., U.S. Pat. No. 1,510,279, and Rateson, U.S. Pat. No. 1,274,349.

It has been found desirable to facilitate the partial escape of moisture from these apparatuses in order to develop a degree of porosity in the final baked product. At the same time, however, the dough must absorb some moisture to prevent excessive dehydration. It therefore becomes necessary to contain the dough at a pressure sufficient to limit the extent to which water is converted to steam, since the dough absorbs steam less easily than water, while allowing for a degree of conversion and escape. The dough must also be contained to prevent the escape of the dough itself due to its expansion during baking.

Some prior art systems, such as those disclosed in Turner and White, simply allow for the escape of gases without regard to the fact that dough will tend to escape by the same means. Huth and Rateson likewise do not attempt to prevent the escape of dough, but rather provide sharp edges on the perimeter of their baking containers which cut off the dough that does escape in order to form a visually pleasing final product. Savage does not deal with the problem at all. Brummett addresses the problem by providing a lower mold into which an upper mold tightly fits. The fit between the molds ideally is tight enough to prevent the escape of dough but not so tight as to prevent the partial escape of moisture from the apparatus. Though this apparatus is effective when the proper level of pressure between the molds is attained, taking into account cooking temperature, duration, and type of dough, it will be appreciated that the exact pressure exerted by the fit is difficult to determine, and that it is similarly difficult precisely to adjust the pressure pursuant to differing circumstances.

Savage discloses various advantages of differential heat application in these apparatuses, including uniform baking and gas dispersion

OBJECTS AND SUMMARY OF THE INVENTION

It is therefore an object of the present invention to overcome the shortcomings of the prior art.

It is a further object of the invention to mold dough in an enclosure of a desired shape and bake the dough in the enclosure while maintaining pressure at a precise desired level.

It is a further object of the invention to allow for the partial escape of moisture and gas from a shaping enclosure during baking while inhibiting the formation of steam and preventing the escape of dough.

It is a further object of the invention to provide for the convenient adjustment of pressure during baking in apparatuses for forming and baking dough.

It is a further object of the invention to provide a novel way of differentiating the heat applied to the molding and baking apparatus.

In accordance with a first aspect of the invention, an apparatus for forming and baking dough in a predetermined shape comprises a first mold having a first flange extending from its perimeter, a second mold having a second flange extending from its perimeter, the second flange being substantially co-extensive with the first flange, whereby a closed cavity for placement of the dough is formed when the first and second molds are placed together, and pressure means extrinsic to the molds and flanges for pressing the first and second flanges together to a predetermined degree when the first and second mold members are placed together. In a preferred embodiment, the pressure means comprises a clamp.

In accordance with a second aspect of the invention, a pan for molding dough into a desired shape and baking the dough in that shape upon the application of heat comprises a first mold having first and second opposing surfaces with a common perimeter, the first surface being shaped to mold a first side of the dough, and a second mold having third and fourth opposing surfaces with a common perimeter, the third surface being shaped to mold a second side of the dough and being adapted to receive the first surface in nesting engagement forming a shaped enclosure therebetween. A first flange extends from the perimeter of the first mold and a second flange extends from the perimeter of the second mold approximately parallel to the first flange when the first and second molds are in nesting engagement. The first flange is adapted to lie upon the second flange when the first and second molds are in nesting engagement. Pressure means extraneous to the first and second molds and flanges are provided to press the first and second flanges together at a predetermined pressure.

In accordance with a third aspect of the invention, a method of baking dough in a desired shape in a molding and baking apparatus comprises the steps of placing the dough into a first mold having a first flange extending from its perimeter, placing a second mold on the first mold, the second mold having a second flange extending from its perimeter, the outer edge of the second flange being approximately coextensive with the outer edge of the first flange, thereby creating an interior cavity between the first and second molds and causing the dough to conform to the shape of the interior cavity, applying pressure extrinsic to the apparatus to the first and second flanges to press them together to a predetermined extent, and heating the first and second molds to bake the dough.

Specifically, and in a preferred embodiment, an apparatus for shaping dough into a cupped shape and baking it in that shape while providing for partial release of moisture and preventing escape of the dough from the apparatus comprises an upper cup-shaped mold, a first flange extending approximately horizontally out from the perimeter of the upper mold, a lower cup-shaped mold into which the dough is placed, the lower mold being shaped similarly to and sized slightly larger than the upper mold and adapted to receive the upper mold in nesting position and thereby form a cup-shaped cavity of predetermined thickness between the upper and lower molds and force the dough to conform to the shape of the cavity, and a second flange substantially coextensive with the first flange extending approximately horizontally out from the perimeter of the lower mold member. The first flange lies upon the second flange along the entire lengths of the first and second flanges when the upper mold is nested into the lower mold, and means extraneous to the molds and flanges are provided for pressing the flanges together at a precisely determined pressure.

BRIEF DESCRIPTION OF THE DRAWINGS

These and other objects, aspects, and embodiments of the present invention are described in the following specification with reference to the attached drawing figures, of which.

DETAILED DESCRIPTION OF THE INVENTION

Figure 1:
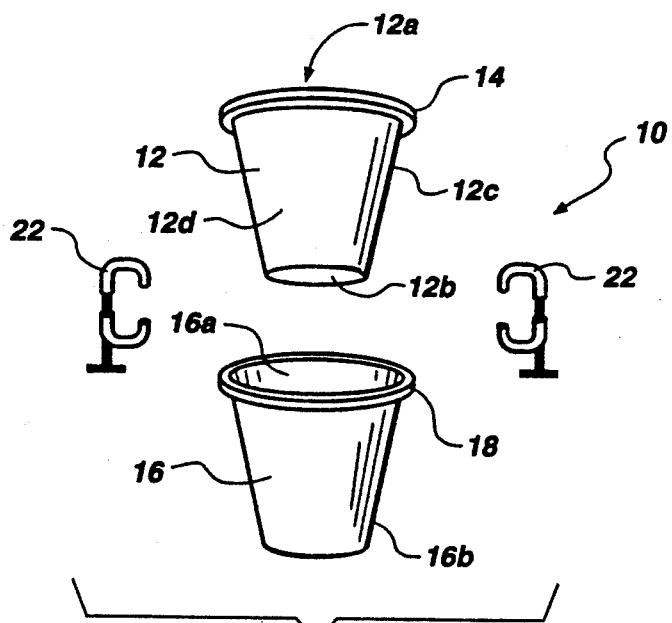
FIG. 1 is a perspective view of an example of a mold apparatus according to the invention, with the upper and lower mold members and clamps separated.
Figure 3:
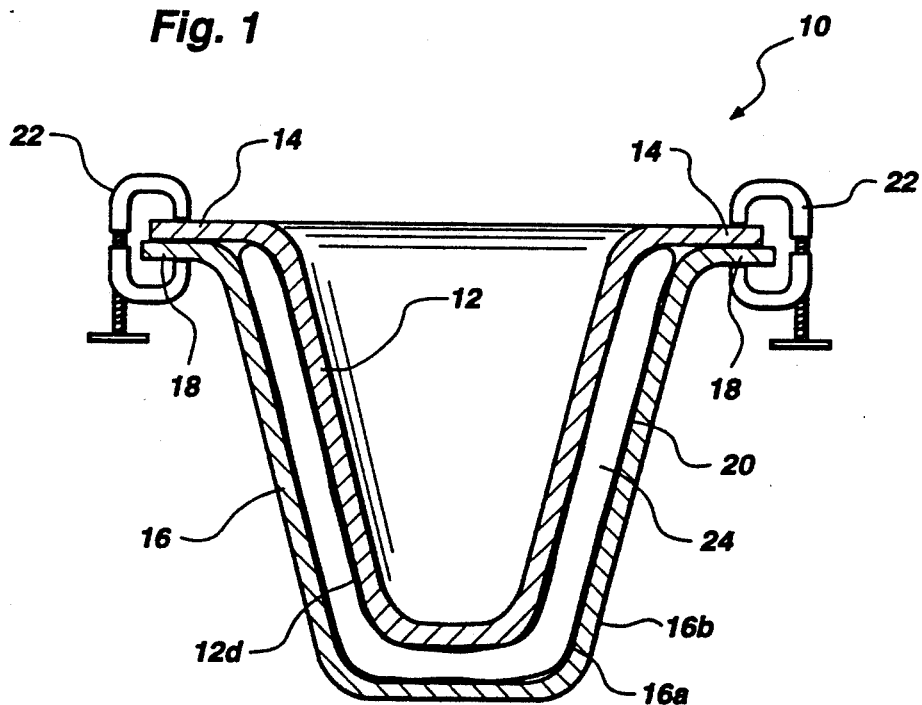
FIG. 3 is a side view in cross-section of the mold apparatus of FIG. 1 with the upper and lower mold members and clamps in engaged relationship.
Figure 2:
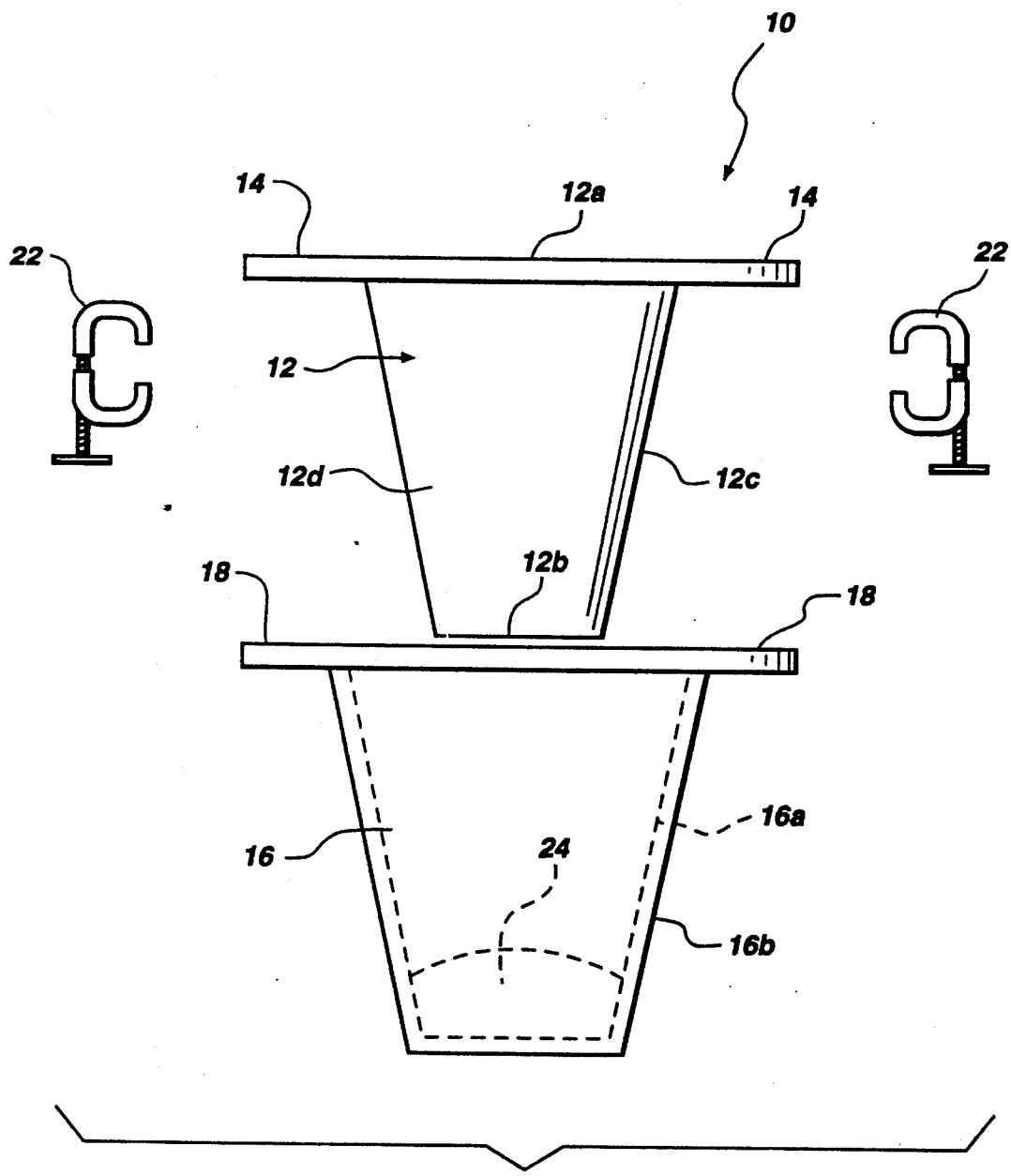
FIG. 2 is a side elevational view of the mold apparatus of FIG. 1.

Referring first to FIGS. 1 to 3, a molding and baking pan 10 according to the invention is adapted to shape or mold dough for cookies, bread, or other baking goods into a cup-like shape and bake the dough in that shape upon the application of heat to the pan. The pan 10 comprises a frustoconical upper mold or mold member 12 having a lower circular closed end 12b and a sloped wall 12c extending up and radially out from the perimeter of the closed end 12b, forming an upper open end 12a at its upper edge. A flange 14 extends horizontally and radially outward from the upper edge of the wall 12c. The junctures between the closed end 12b and the wall 12c and between the wall 12c and the flange 14 are preferably rounded to a radius of approximately ⅛ to 3/16 inches since sharp edges are heat sinks; if the junctures were not rounded, heat during baking would concentrate on the edges making the heating in the mold 12 undesirably non-uniform. Edges at the top of the mold, however, specifically at the juncture of the flange 14 and the wall 12c, are of less importance than edges in the body of the mold.

The mold 12 is preferably integrally constructed of aluminum at a uniform thickness of approximately 0.045-0.05 inches. The mold 12 therefore may be constructed of a single sheet of aluminum formed into the desired shape. The exterior surface 12d of the mold 12, which contacts the dough, is covered with TEFLON TM in the preferred embodiment to ease the removal of the baked product from the pan 10. The outward radial sloping of the wall 12c further eases removal. It will be appreciated by those skilled in the art that other shapes and geometries of the mold 12 are possible, and that the specifics of material of which it is made can be changed without departing from the scope of the invention. For example, the mold may be formed as a hemisphere, cone, or other shape and may be constructed of cast iron or other material. Additionally, it can be stamped from a solid piece of material instead of formed from a sheet.

The pan 10 further comprises a lower mold or mold member 16 adapted to be placed in nesting engagement with the upper mold 12. It is anticipated that the lower mold 16 will be placed directly underneath the upper mold 12 so that they nest in a vertical direction. The lower mold 16 is of substantially the same shape as the upper mold 12 in the preferred embodiment and is of the same thickness and material. The interior surface 16a of the lower mold 16 is covered with TEFLON similarly to the exterior surface 12d of the upper mold 12. Additionally, the exterior surface 16b of the lower mold 16 is covered with a black TEFLON coating. This black coating causes the lower mold 16 to absorb more heat than the upper mold 12 during heating of the pan 10, creating a heat differential or gradient through the dough to be baked. The advantages of a heat differential are discussed in Savage, U.S. Pat. No. 4,812,323, hereby incorporated by reference as though fully set forth herein. Dark coating of material other than TEFLON could also be used on the surface 16b if desired. A flange 18 extends horizontally and radially outward from the upper edge of the mold 16.

The lower mold 16 is slightly larger than the upper mold 12 so that the mold 12 can fit into the mold 16 in nesting engagement forming a frustoconical enclosure 20 between the exterior surface 12d of the mold 12 and the interior surface 16a of the mold 16. The dough is molded and baked in the enclosure 20, which has a uniform thickness of approximately one centimeter or less in a preferred embodiment. The upper flange 14 rests upon the lower flange 18 when the molds are nested, sealing off the enclosure 20 at its upper edge. After the molds are placed in this position, a plurality of clamps 22 press the flanges 16 and 18 together at a predetermined pressure. The clamps 22 are conventional C-clamps in the illustrated embodiment, but may alternatively comprise any suitable clamping or pressing means, particularly those which are extrinsic to the molds and flanges themselves, i.e., means other than the weight of the flange 14 on the flange 18 or fit between the molds or flanges. Whatever clamping or pressing means is used preferably is easily adjustable.

The pressure seal of the flanges is maintained at a pressure level where conversion of water (a liquid) to steam (a gas) is inhibited so that the dough can absorb moisture more readily (absorption of water is easier in its liquid form). The seal must, however, be partial so that some moisture is released in order to allow the dough to develop some porosity as it bakes. A partial seal as contemplated by the invention results in the dough baking into a desirable layered closed grain texture. The pressure seal also prevents dough from escaping from the enclosure 20 during baking. Leavened or leavening dough expands while it bakes, thus tending to escape any closely confined enclosure unless the enclosure is pressure sealed.

In a particular embodiment in which the pan 10 is adapted to mold and bake cookie dough, the clamps 22 apply a pressure of up to approximately 1.0 pound per square inch (psi), or more specifically between 0.5 to 1.0 psi, on the flanges 14,18. The pressure may be varied according to the particular texture of the baked good desired, the type of dough used in the pan, and contemplated baking time.

In operation of the pan 10, an appropriate amount of dough 24 is placed in the lower mold 16. The dough can be previously proofed (raised), if needed, before placement in the lower mold 16, or it can be proofed in the mold 16 itself. Many types of dough, conventional cookie dough for example, do not require proofing in which case the dough is placed in the lower mold 16, molded, and baked immediately after mixing. To mold the dough, the upper mold 12 is placed in nesting position into the lower mold 16 in order to compress the dough 24 between the molds and force it into the frustoconical shape defined by the enclosure 20. The clamps 22 are then applied to the flanges 14 and 18, pressing them together at a suitable predetermined pressure as discussed above.

After the clamps 22 are applied, the pan 10 is subjected to heat to bake the dough which has been shaped therein. A heat differential is established between the exterior surface 12d of the upper mold and the interior surface 16a of the lower mold if, as is preferable, the lower mold 16 is subjected to or absorbs more of the heat than the upper mold 12. It has been discovered in the baking of cookie dough that a heat transfer rate within the upper mold 12 of approximately 30-60% of the heat transfer rate within the lower mold 16 results in a uniformly baked cookie with satisfactory texture. An upper mold heat transfer rate equal or more than the lower mold heat transfer rate often results in a cookie whose lower portion or surface is undercooked and whose upper portion or surface is overcooked and pitted and cracked from excessive formation of gas bubbles at the upper surface.

Figure 4:
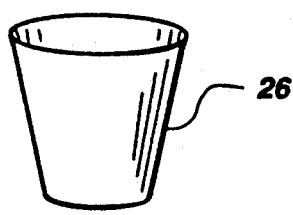
FIG. 4 is a perspective view of a bread cup baked in the mold apparatus of FIG. 1.

After the dough 24 is molded and baked by the application of heat to the pan 10, the clamps 22 are removed and the upper mold 12 is taken out of its nesting position in the mold 16. The teflon coating of the exterior surface 12d of the mold 12 facilitates removal of the mold without tearing or damaging the final baked product. The baked dough is then removed from the lower mold 16, the teflon coating of the interior surface 16a of the lower mold 16 facilitating its removal. The result is a baked good 26 as shown in FIG. 4, which is frustoconically shaped and ready to eat. If the baked good is a cookie, it may be filled with ice cream, pudding, or other sweet filling for a dessert pastry. If it is bread, it may be filled with chili, soup, or the like, thus taking the place of a dish which must be washed or thrown away. It has been found that a particular bread baked according to the invention is capable of holding hot water for approximately 30 minutes without leaking.

Figure 5:
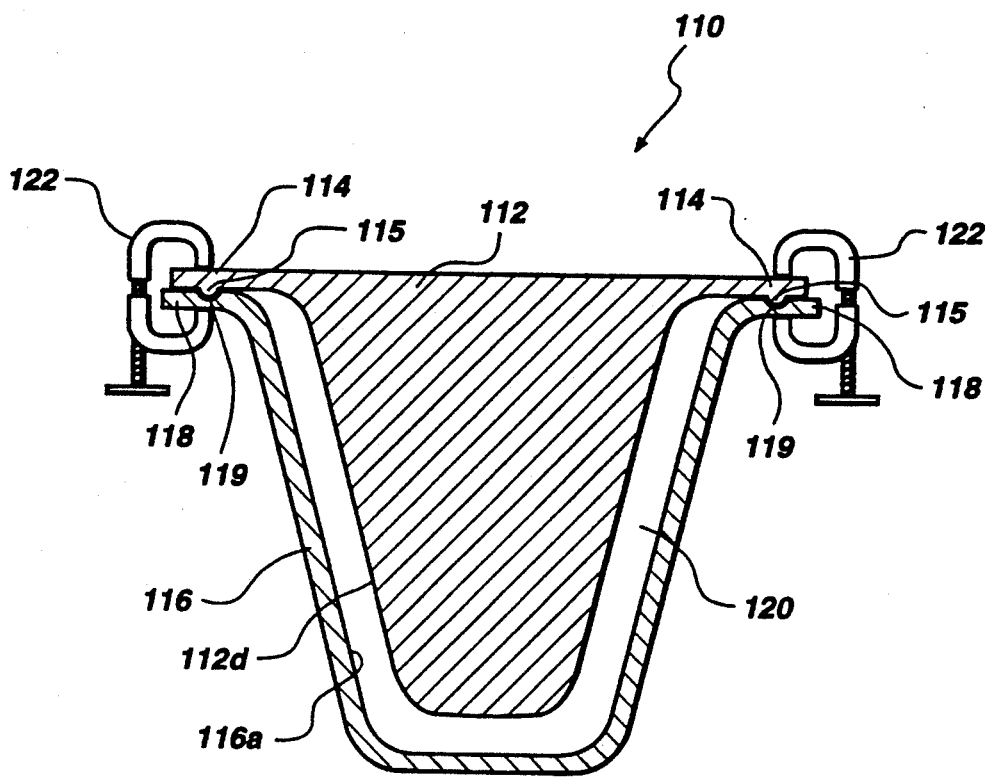
FIG. 5 is a side view in cross-section of a second example of a mold apparatus according to the invention.

Referring now to FIG. 5, another example of a pan 110 according to the invention comprises an upper mold 112 which is similar in all respects to the mold 12 except that the mold 112 is formed from a solid piece of aluminum instead of a bent sheet. Additionally, the flange 114 extending from the mold 112 contains an annular ridge 115 depending downwardly therefrom. While the exterior surface 112d, the face of the upper mold 112 which contacts the dough, is preferably of approximately the same shape as the interior surface 116a, the face of the lower mold 116 which contacts the dough, the rest of either mold can be shaped or thickened as desired, keeping in mind that baking times, configurations, and temperatures will need to be adjusted accordingly. The facing surfaces of the molds can also vary from each other in shape, if desired, if the shape of the final baked product is desired to be of non-uniform thickness.

The solid nature of the mold 112 causes it to impart a lower temperature to the dough than the lower mold and thereby differentiate the applied heat. Differential heating could also be accomplished by providing dead air space in the body of the mold 112.

The lower mold 116 of the pan 110 is similar in all respects to the mold 16 except that the flange 118 contains an annular groove 119 adapted to engage the annular ridge 115 when the molds are nested. This engagement results in a more effective seal between the flanges 114 and 118 when the clamps 122 are applied and, further, precisely centers the upper mold 112 in the lower mold 116 so that the enclosure 120 therebetween is of uniform thickness.

Figure 6:
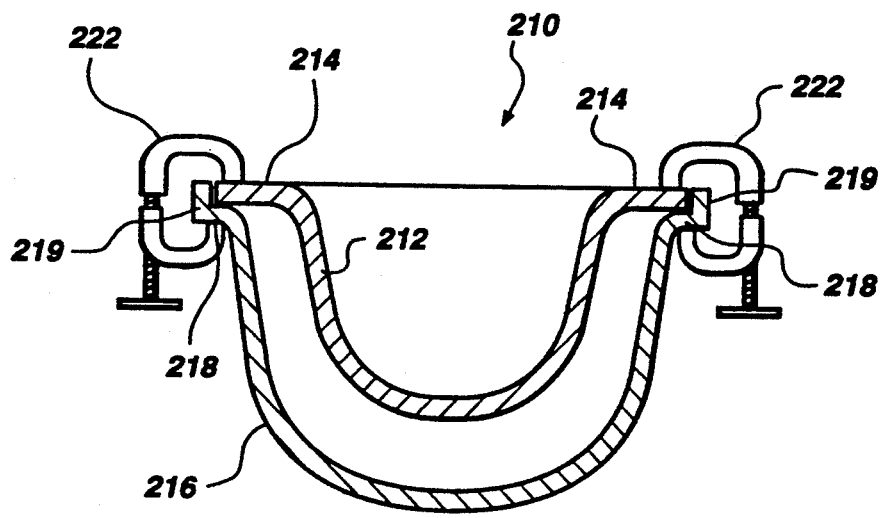
FIG. 6 is a side view in cross-section of a third example of a mold apparatus according to the invention.

Referring now to FIG. 6, an example of a pan 210 according to the invention comprises an upper mold 212 which is similar to the mold 12 except that it is shaped as a hemispherical dome instead of a frustum. A flange 214 horizontally extends from the upper edge of the mold. The lower mold 216 is similar to the mold 16 except that is has the shape of a hemispherical dome instead of a frustum, and contains a short flange 219 extending upwardly from the horizontal flange 218 at its top edge. The perimeter of the upper flange 214 fits snugly into the circle formed by the vertical flange 219. This flange configuration improves sealing and centers the upper mold 212 in the lower mold 216.

Figure 7:
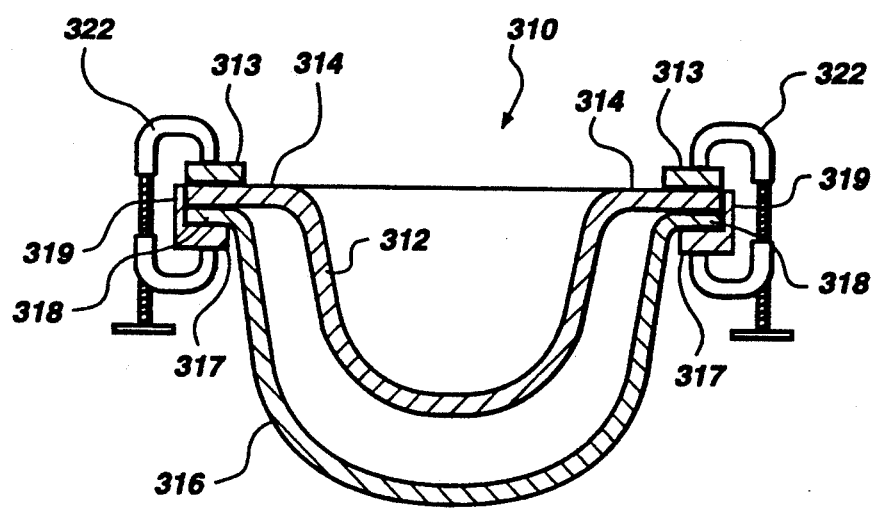
FIG. 7 is a side view in cross-section of a fourth example of a mold apparatus according to the invention.

Referring now to FIG. 7, an example of a molding and baking pan 310 according to the invention comprises an upper mold 312 similar to the mold 212 except that a support ring 313 is secured to the top of the flange 314 by screws or other suitable means. The ring 313, made of brass in the preferred embodiment, provides a solid base for the application of the clamps 322 against the flange 314. The lower mold 316 is similar to the mold 216 except that it does not integrally contain a vertical flange. Instead, a support ring 317, constructed of aluminum in the preferred embodiment, is secured to the bottom of the lower flange 318. The support ring 317 contains a vertical flange 319 which extends upwardly at the perimeter of the upper and lower flanges 314 and 318 and performs the same functions as the vertical flange 219 in FIG. 6. The ring 317 provides a solid base for the application of the clamps 322 against the flange 318.

Figure 8:
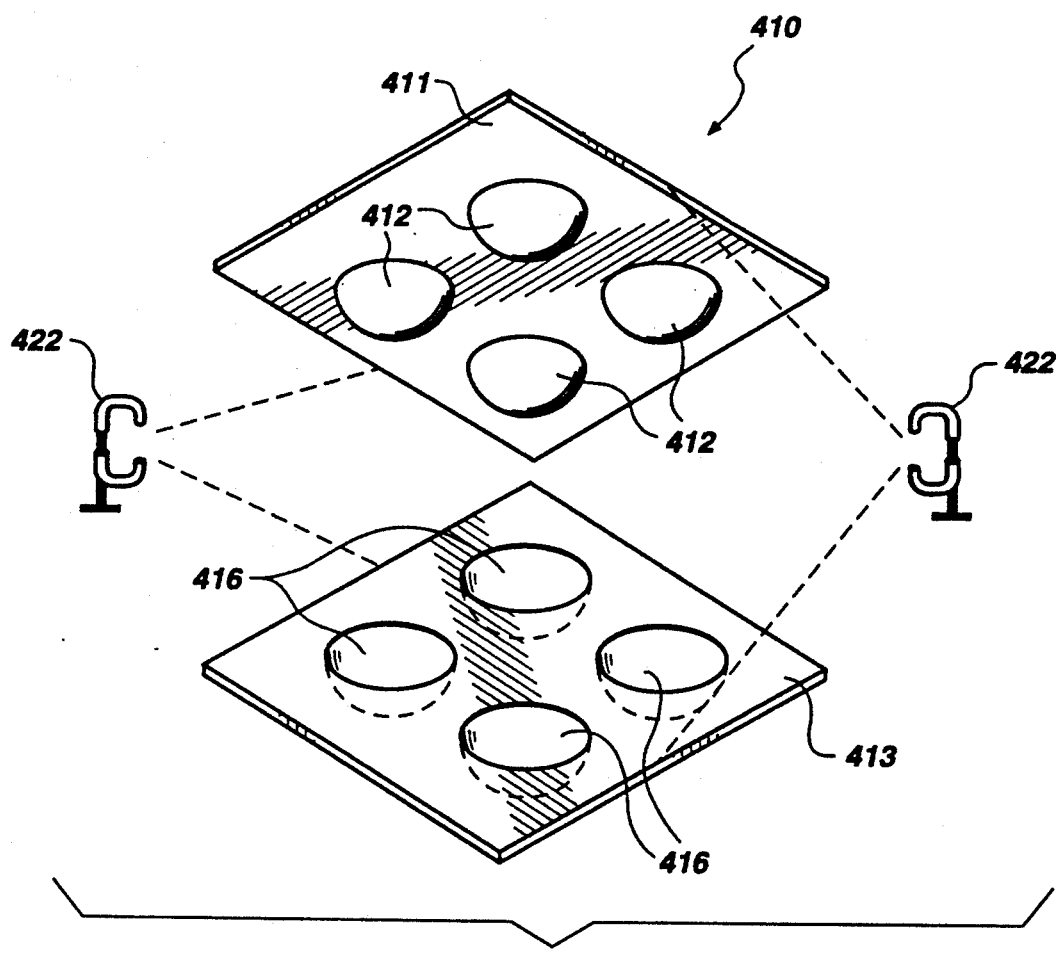
FIG. 8 is a perspective view of an example of a multiple-cavity mold apparatus according to the invention.

Referring now to FIG. 8, a multi-cavity shaping and baking pan 410 according to the invention is shown. The pan 410 comprises an flat rigid upper support plate 411 having a plurality of upper molds 412 depending downwardly therefrom. The molds 412 are hemispherical in the embodiment shown, but may be of any suitable shape as earlier discussed. A flat rigid lower support plate 413 has a plurality of lower molds 416 depending downwardly therefrom. The upper molds 412 are adapted to nest into the lower molds 416 forming enclosures for the molding and baking of dough. When the molds are nested, the support plate 411 rests upon the support plate 413 and clamps 422 press the plates 411 and 413 together at a predetermined pressure. Thus the plates 411 and 413 take the place of the flanges described earlier in previous embodiments. The plates alternatively may be viewed simply as rigid connections from the flanges of each mold cavity to the flanges of the others.

It will be appreciated from the description of the pan 410 that the clamps or other pressure means need not be applied directly at the perimeter of the molds but may be farther removed therefrom if means are provided to impart the applied pressure to the perimeter of the enclosure.

It will be understood that variations and modifications of the described embodiments will be apparent to those skilled in the art without departing from the scope of the invention. The described apparatuses and methods are not meant to be a delineation of the scope of the invention but merely as examples of possible embodiments.

I claim:

1. An apparatus for forming and baking dough in a predetermined shape comprising:
   a first mold having a first flange extending from its perimeter;
   a second mold having a concave first side which is adapted to receive the first mold and an opposite second side which is darkly colored with respect to the first side and the first mold and a second flange extending from its perimeter, the second flange being substantially co-extensive with the first flange, wherein a closed cavity for placement of the dough is formed when the first and second molds are placed together;
   pressure means extrinsic to the molds and flanges for pressing the first and second flanges together to a predetermined degree when the first and second mold members are placed together;
   wherein the darkly colored outer surface of the second mold increases the heat retained by the second mold relative to the heat retained by the first mold when heat is applied to the apparatus.

2. The apparatus of claim 1 wherein the pressure means comprises a clamp.

3. A pan for molding dough into a desired shape and baking the dough in that shape upon the application of heat comprising:
   a first mold, including a perimeter, having first and second opposing surfaces, the first surface being shaped to mold a first side of the dough;
   a second mold, including a perimeter, having third and fourth opposing surfaces, the third surface being shaped to mold a second side of the dough and being adapted to receive the first surface in nesting engagement forming a shaped enclosure therebetween and the fourth surface being darkly colored with respect to the other three surfaces to increase the heat retained by the second mold relative to the heat retained by the first mold when heat is applied to the pan;
   a first flange extending from the perimeter of the first mold, said first flange and said perimeter of the first mold defining an intersection therebetween;
   a second flange extending from the perimeter of the second mold approximately parallel to the first flange when the first and second molds are in nesting engagement, said second flange and said perimeter of the second mold defining an intersection therebetween;
   the first flange being adapted to lie upon he second flange when the first and second molds are in nesting engagement;
   pressure means extraneous to the first and second molds and flanges for pressing the first and second flanges together at a predetermined pressure.

4. The apparatus of claim 3 wherein the first and second flanges are oriented approximately perpendicular to the direction in which the first and second molds are nested.

5. The apparatus of claim 3 wherein the first and third surfaces are of approximately the same shape, the first surface being of somewhat smaller size than the third surface, and wherein the enclosure formed between the first and third surfaces when the first and second molds are in nesting engagement is of approximately uniform thickness.

6. The apparatus of claim 5 wherein the first surface is shaped substantially as a convex dome and the third surface is shaped substantially as a concave dome.

7. The apparatus of claim 5 wherein the first surface is shaped substantially as a convex frustum and the third surface is shaped substantially as a concave frustum, each frustum comprising a closed base, a sloped containing wall, and an open top.

8. The apparatus of claim 7 wherein the intersections between the close d tops and containing walls of the frustums are rounded to a radius of approximately ⅛ to 3/16 inches.

9. The apparatus of claim 3 further comprising plurality of first and second molds such that the first molds are rigidly attached together at their first flanges and the second molds are rigidly attached together a their second flanges.

10. The apparatus of claim 3 wherein the intersections between the first and second flanges and the perimeters of the first and second molds, respectively, are rounded to a radius of approximately ⅛ to 3/16 inches.

11. The apparatus of claim 3 wherein the first and second molds comprise aluminum of approximate thickness of 0.045 to 0.05 inches.

12. The apparatus of claim 3 wherein the pressure means comprises a C clamp.

13. The apparatus of claim 3 wherein both first and second flanges have a length, and further comprising a ridge disposed at least partially along the length of the first flange and a corresponding groove disposed at least partially along the length of the second flange, the ridge being adapted for engagement with the groove when the first mold is nested into the second mold.

14. The apparatus of claim 3 further comprising a third flange extending perpendicularly from the perimeter of the second flange, and wherein the perimeter of the first flange is of approximately the same shape and of slightly smaller size than the area circumscribed by the third flange, whereby the first flange fits snugly into the area circumscribed by the third flange when the first and second molds are in nesting engagement.

15. The apparatus of claim 3 further comprising first and second reinforcing rings placed on the first and second flanges, respectively, opposite to the surfaces by which they engage each other.

16. The apparatus of claim 3 wherein the fourth surface is darkened by means of placement onto it of a dark layer of TEFLON.

17. The apparatus of claim 3 wherein the pressure means is precisely adjustable.

18. The apparatus of claim 3 wherein the pressure means presses the first and second flanges together at a pressure of between approximately 0 and 1 pounds per square inch.

19. The apparatus of claim 3 wherein the pressure means presses the first and second flanges together at a pressure between approximately 0.5 and 1 pounds per square inch.

20. The apparatus of claim 3 wherein the pressure means presses the flanges together a sufficient amount to prevent the escape of dough from the pan during the application of heat, at the same time inhibiting the formation of steam and allowing the partial escape of moisture.

21. An apparatus for shaping dough into a cup-shape and baking it in that shape while providing for partial release of moisture and preventing escape of the dough from the apparatus comprising:

an upper, cup-shaped mold having a perimeter;

a first flange, having a length, extending approximately perpendicularly from the perimeter of the upper mold;

a lower, cup-shaped, mold into which the dough is placed, the lower mold having a darkly colored outer surface relative to the other surfaces of the upper and lower molds and which is opposite the cup portion and being shaped similarly to and sized slightly larger than the upper mold and adapted to receive the upper mold in nesting position and thereby form a cup-shaped cavity of predetermined thickness between the upper and lower molds and force the dough to conform to the shape of the cavity;

a second flange, having a length, substantially coextensive with the first flange extending approximately perpendicularly from the perimeter of the lower mold;

wherein the first flange lies upon the second flange along the entire lengths of the first and second flanges when the upper mold is nested into the lower mold;

pressure means, extraneous to the mold and flanges, for pressing the flanges together at a precisely determined pressure wherein the darkly colored outer surface of the lower mold increases the heat retained by the lower mold relative to the heat retained by the upper mold when heat is applied to the apparatus.

* * * * *